US008472620B2

(12) United States Patent
Pavlovic

(10) Patent No.: US 8,472,620 B2
(45) Date of Patent: Jun. 25, 2013

(54) GENERATION OF DEVICE DEPENDENT RSA KEY

(75) Inventor: Nenad Pavlovic, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1383 days.

(21) Appl. No.: 11/763,564

(22) Filed: Jun. 15, 2007

(65) Prior Publication Data

US 2008/0310634 A1    Dec. 18, 2008

(51) Int. Cl.
*H04L 9/08* (2006.01)
*H04L 9/12* (2006.01)

(52) U.S. Cl.
USPC .................. 380/30; 380/270; 380/44

(58) Field of Classification Search
USPC .............................. 380/30, 270, 44
See application file for complete search history.

(56) References Cited

U.S. PATENT DOCUMENTS

| | | | | |
|---|---|---|---|---|
| 4,351,982 | A | * | 9/1982 | Miller et al. .................... 380/30 |
| 4,736,423 | A | | 4/1988 | Matyas |
| 5,717,756 | A | * | 2/1998 | Coleman ....................... 713/155 |
| 5,850,450 | A | * | 12/1998 | Schweitzer et al. ............. 380/30 |
| 7,050,584 | B1 | * | 5/2006 | Hoffmann et al. .............. 380/44 |
| 7,634,084 | B2 | | 12/2009 | Futa et al. |
| 2006/0198514 | A1 | * | 9/2006 | Lyseggen et al. ............... 380/28 |
| 2007/0147603 | A1 | * | 6/2007 | Nakano et al. .................. 380/28 |

FOREIGN PATENT DOCUMENTS

| | | |
|---|---|---|
| CN | 1898898 A | 1/2007 |
| EP | 1 633 075 | 3/2006 |
| FR | 2 841 411 | 12/2003 |
| WO | 02 05483 | 1/2002 |

OTHER PUBLICATIONS

Joye et al., "Fast Generation of Prime Numbers on Portable Devices: An Update", pp. 160-173.
Peyravian et al., "Generation of RSA Keys That Are Guaranteed to be Unique for Each User", pp. 282-288.
Written Opinion for International Application No. PCT/IB2007/003931 dated May 23, 2008.
International Preliminary Report on Patentability for International Application No. PCT/IB2007/003931 dated Sep. 30, 2009.

* cited by examiner

*Primary Examiner* — Kambiz Zand
*Assistant Examiner* — Aubrey Wyszynski
(74) *Attorney, Agent, or Firm* — Renner, Otto, Boisselle & Sklar, LLP

(57) ABSTRACT

A portable electronic device for exchanging encrypted data with other electronic devices includes a processor, a memory operatively coupled to the processor, and a prime number generation circuit operatively coupled to the processor and memory. The prime number generation circuit includes logic that generates at least two prime numbers based on unique data stored in the electronic device, wherein said at least two prime numbers are always the same at least two prime numbers. The generated prime numbers then can be used to generate RSA public and private keys within the electronic device.

22 Claims, 4 Drawing Sheets

GENERATION OF DEVICE DEPENDENT RSA KEY

TECHNICAL FIELD OF THE INVENTION

The present invention relates generally to electronic devices, such as electronic devices for engaging in voice communications. More particularly, the invention relates to a device and method for generating a unique device dependent RSA key pair within the electronic device.

DESCRIPTION OF THE RELATED ART

Mobile and/or wireless items of electronic devices are becoming increasingly popular and are now in wide-spread use. In addition, the features associated with certain types of electronic devices have become increasingly diverse. To name a few examples, many electronic devices include cameras, text messaging capability, Internet browsing functionality, electronic mail capability, video playback capability, audio playback capability, image display capability, navigation capability, and hands-free headset interfaces.

As is evident, a dominant feature of electronic devices is the exchange of data over various communication networks. When exchanging data over communication networks, such as wireless communication or data networks, it is preferable to provide a level of security to prevent unauthorized use of the exchanged data. Generally, such security is provided by encrypting the data using an encryption algorithm. In electronic devices such as mobile telephones, for example, RSA is often used to provide such security.

RSA is an algorithm for public-key encryption and is widely used in electronic commerce protocols. RSA utilizes a public and private key, wherein the public key can be known to everyone and is used for encrypting messages. Messages encrypted with the public key, however, can only be decrypted using the private key.

Conventionally, each electronic device is provided with a unique private key that is externally generated (e.g., via software executed on a computer and then communicated to the electronic device). Once generated, the key is stored in the electronic device. To maintain security, it is preferable that the key is generated in a secure environment, such as, for example, a secure area within the electronic device manufacturer's facility, and then immediately stored on the electronic device in encrypted form.

In use, each time the key is needed it is retrieved from storage, decrypted and used. After use, the decrypted key should be removed from memory to prevent unauthorized access to the key.

SUMMARY

A drawback to the above method of implementing RSA keys in electronic devices is that the key handling can be costly and can create technical problems. For example, the complexity of the key handling system can cause production stoppage at the factory floor.

The present invention enables generation of a unique key without the drawbacks of the prior art. More specifically, a unique RSA key pair, for example, may be generated, used and erased an unlimited number of times within the device itself. In this manner, the key need not be externally generated. Moreover, the same key pair may be regenerated by the electronic device each time it is needed. Since RSA key generation is based on obtaining two prime numbers, the same key may be generated by deriving two prime numbers that are based on data stored in the electronic device, such as a hardware key of the electronic device, for example. Further, an algorithm for deriving the prime numbers can be configured such that the same prime numbers are always obtained for a particular device, yet the prime numbers (and thus the keys) are unique between devices.

The method and device described herein increases security of data exchange, as the external generation of keys, which can be subject to a security breach, need not be implemented. Further, since keys are internally generated, they cannot be lost. Also, should changes be made to the schema for securing keys, the manufacturer's external software tools need not be modified as they are not affected by such changes.

According to one aspect of the invention, a portable electronic device for exchanging encrypted data with other electronic devices, comprises: a processor and memory; and a prime number generation circuit operatively coupled to said processor and memory, said prime number generation circuit including logic that generates at least two prime numbers based on unique data stored in the electronic device, wherein said at least two prime numbers are always the same at least two prime numbers.

According to one aspect of the invention, the at least two prime numbers are different from one another.

According to one aspect of the invention, the prime number generation circuit further includes logic that derives prime numbers that have a length of at least a predetermined number of bytes.

According to one aspect of the invention, the unique data is characteristic data of the electronic device.

According to one aspect of the invention, the prime number generation circuit further includes logic that uses a hardware dependent key of the electronic device as the characteristic data, said hardware dependent key being unique for each electronic device.

According to one aspect of the invention, the prime number generation circuit further includes logic that uses an HMAC operation in conjunction with the hardware dependent key to generate a repeatable hash value having a predetermined length.

According to one aspect of the invention, the prime number generation circuit further includes: logic that converts the at least two probably prime numbers to odd numbers if the at least two probably prime numbers are even numbers; and logic that determines if the at least two probably prime numbers are prime numbers.

According to one aspect of the invention, the logic that determines if the at least two probably prime numbers are prime numbers includes: logic that tests the at least two probably prime numbers for primality; logic that increments a probably prime number of the at least two probably prime numbers by two when the respective probably prime number fails the primality test; and logic that repeats the determination step using the incremented probably prime number.

According to one aspect of the invention, the logic that determines if the at least two probably prime numbers are prime numbers includes: logic that tests the at least two probably prime numbers for primality; logic that regenerates a predetermined number of least significant bytes of a probably prime number of the at least two probably prime numbers that fails the primality test; and logic that repeats the primality test and the regeneration of the least significant bytes until the probably prime number is a prime number.

According to one aspect of the invention, the device further comprises logic that caches parameters utilized in generating the at least two prime numbers, and logic that reuses the cached parameters during subsequent RSA key generation.

According to one aspect of the invention, the logic caches at least one of an RSA public key exponent or a modulus of both the public key and a private key.

According to one aspect of the invention, the device further comprises an RSA generation circuit operative to generate public and private RSA keys within the electronic device based on the at least two prime numbers.

According to one aspect of the invention, the portable electronic device is a mobile telephone.

According to one aspect of the invention, a method for generating at an RSA key within a portable electronic device, comprises: generating at least two prime numbers based on unique data stored within the electronic device, wherein said at least two prime numbers are always the same at least two prime numbers; and using the at least two prime numbers to generate a private and public RSA key.

According to one aspect of the invention, the method further comprises clearing the private RSA key from memory after use of the private RSA key.

According to one aspect of the invention, generating includes deriving prime numbers that have a length of at least a predetermined number of bytes.

According to one aspect of the invention, generating includes using a hardware dependent key of the electronic device as the unique data.

According to one aspect of the invention, generating includes using an HMAC operation in conjunction with the hardware dependent key to generate a repeatable hash value having a predetermined length.

According to one aspect of the invention, generating includes: generating at least two probably prime numbers; converting respective ones of the at least two probably prime numbers to odd numbers if the respective ones of the at least two probably prime numbers are even numbers; and determining if the at least two probably prime numbers are prime numbers.

According to one aspect of the invention, determining if the at least two probably prime numbers are prime numbers includes: testing the at least two probably prime numbers for primality; incrementing respective ones of the at least two probably prime numbers by two when the respective probably prime numbers fail the primality test; and repeating the determination step using the respective incremented probably prime number.

According to one aspect of the invention, wherein determining if the at least two odd numbers are prime includes: testing the at least two odd numbers for primality; regenerating a predetermined number of last bytes of the at least two probably prime numbers when the respective odd numbers are not prime; and repeating the testing and regenerating steps until the at least two odd numbers are prime.

According to one aspect of the invention, the method further comprises caching parameters utilized in generating the at least two prime numbers, and reusing the cached parameters during subsequent RSA key generation.

According to one aspect of the invention, caching includes caching at least one of an RSA public key exponent or a modulus of both the public key and a private key.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
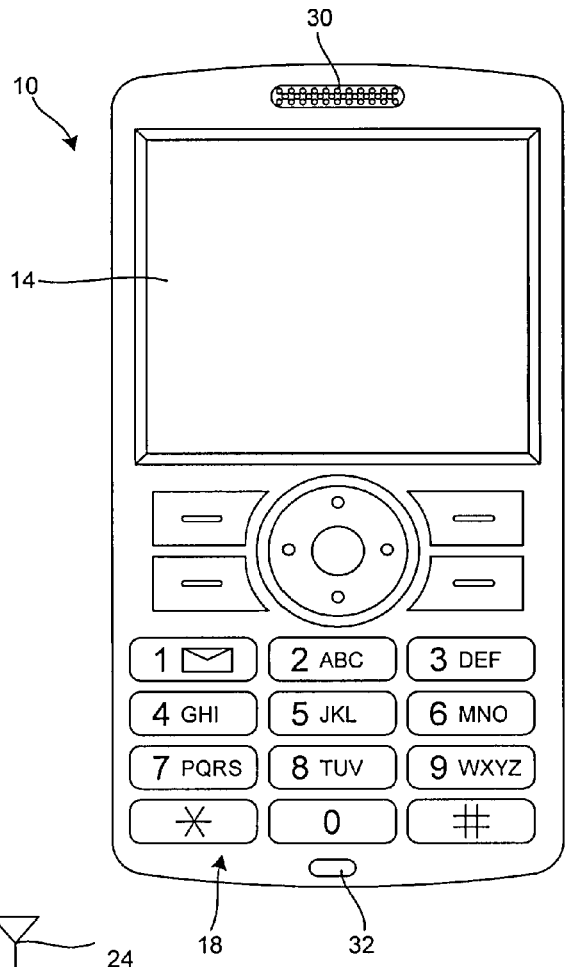
FIG. 1 is a schematic view of a mobile telephone as an exemplary electronic device in accordance with an embodiment of the present invention.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smart phones, portable communication apparatus, portable gaming device, and the like.

In the present application, embodiments of the invention are described primarily in the context of a mobile telephone. However, it will be appreciated that the invention is not intended to be limited to the context of a mobile telephone and may relate to any type of appropriate electronic equipment.

Figure 2:
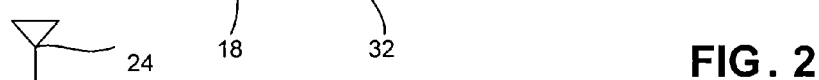
FIG. 2 is a schematic block diagram of the relevant portions of the mobile telephone of FIG. 1 in accordance with an embodiment of the present invention.

Referring initially to FIGS. 1 and 2, an electronic device 10 is shown. The electronic device 10 includes an RSA key generation function 12 that is configured to automatically generate an RSA private and public key within the electronic device 10. Additional details and operation of the RSA key generation function 12 will be described in greater detail below. The RSA key generation function 12 may be embodied as executable code that is resident in and executed by the electronic device 10. In one embodiment, the RSA key generation function 12 may be a program stored on a computer or machine readable medium. The RSA key generation function 12 may be a stand-alone software application or form a part of a software application that carries out additional tasks related to the electronic device 10.

The electronic device of the illustrated embodiment is a mobile telephone and will be referred to as the mobile telephone 10. The mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 (FIG. 2) of the mobile telephone 10. The display 14 may be used to present images, video and other graphics to the user, such as photographs, mobile television content and video associated with games.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys also may include menu navigation and select keys to facilitate navigating through a menu displayed on the display 14. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 14. Also, the display 14 and keypad 18 may be used in conjunction with one another to implement soft key functionality.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages (e.g., a text message is commonly referred to by some as "an SMS," which stands for short message service), instant messages, electronic mail messages, multimedia messages (e.g., a multimedia message is commonly referred to by some as "an MMS," which stands for multimedia message service), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein.

The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10.

The memory 16 may include a read only memory area that is implemented using nonvolatile memory 16a, and a random access or system memory area that is implemented using volatile memory 16b. As will be appreciated, nonvolatile memory tends not to lose data storage capability upon loss of power and is typically used to store data, application code, files and so forth. The nonvolatile memory 16a may be implemented with a flash memory, for example. The flash memory may have a NAND architecture, but other flash memory architectures, such as a NOR architecture, may be used. As will be appreciated, volatile memory tends to lose data storage capability upon loss of power and is typically used to store data for access by the processing device 22 during the execution of logical routines. The volatile memory 16b may be a random access memory (RAM). The RAM may be a synchronous dynamic random access memory (SDRAM), for example, but other RAM architectures that utilize memory blocks may be used. Data may be exchanged between the nonvolatile memory 16a and the volatile memory 16b as is conventional. The sizes of the nonvolatile memory 16a and the volatile memory 16b may be sized as is appropriate for the mobile telephone 10 or other electronic device in which the memory 16 is used.

In addition, the processing device 22 may execute code that implements the RSA key generation function 12. It will be apparent to a person having ordinary skill in the art of computer programming, and specifically in application programming for mobile telephones or other electronic devices, how to program a mobile telephone 10 to operate and carry out logical functions associated with the RSA key generation function 12 based on the description herein. Accordingly, details as to specific programming code have been left out for the sake of brevity. Also, while the RSA key generation function 12 is executed by the processing device 22 in accordance with a preferred embodiment of the invention, such functionality could also be carried out via dedicated hardware, firmware, software, or combinations thereof, without departing from the scope of the invention. Any of these implementations may be referred to as a RSA key generation circuit 12 or simply a logic circuit.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 also may include a system clock 40 for clocking the various components of the mobile telephone 10, such as the control circuit 20. The control circuit 20 may, in turn, carry out timing functions, such as timing the durations of calls, generating the content of time and date stamps, and so forth.

The mobile telephone 10 may include a camera 42 for taking digital pictures and/or movies. Image and/or video files corresponding to the pictures and/or movies may be stored in the memory 16.

The mobile telephone 10 also may include a position data receiver 44, such as a global positioning system (GPS) receiver, Galileo satellite system receiver or the like.

The mobile telephone 10 also may include a local wireless interface 46, such as an infrared transceiver and/or an RF interface (e.g., a Bluetooth interface), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

Figure 3:
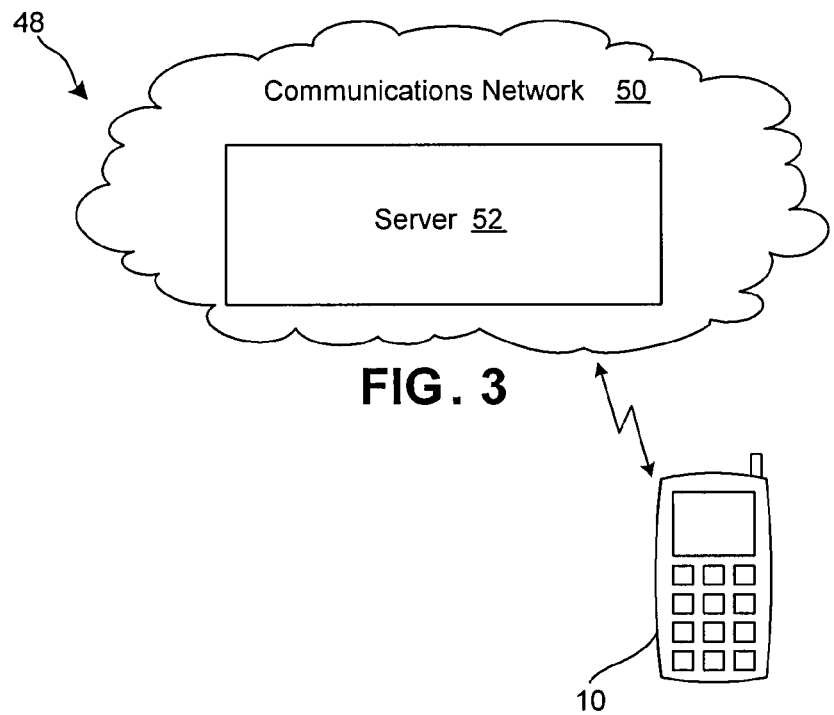
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices.

As will be appreciated, the server 52 may be configured as a typical computer system used to carry out server functions and may include a processor configured to execute software containing logical instructions that embody the functions of the server 52 and a memory to store such software.

Moving now to the RSA key generation function 12, the general steps for creating RSA public and private keys are shown below.

Two distinct large random prime numbers ρ and q are chosen.

Compute η=ρq, where η is the modulus for both the public and private keys.

Compute the totient $\Phi(\eta)=(p-1)(q-1)$. This was changed to $\lambda(\eta)=\text{lcm } (p-1, q-1)$ in PKCS#1 v2.0.

Choose an integer e such that $1<e<\Phi(\eta)$, and e is coprime to $\Phi(\eta)$, i.e., e and $\Phi(\eta)$ share no factors other than 1; $\gcd(e,\Phi(\eta))=1$.

e is released as the public key exponent.

Compute d to satisfy the congruence relation d e≡1 (mod $\Phi(\eta)$), i.e., d e=1+k$\Phi(\eta)$ for some integer k.

d is kept as the private key exponent.

A dominant step in calculating the RSA keys is the selection of the prime numbers p and q, as all other values are directly or indirectly derived therefrom. If the same prime numbers are always generated, then the same private and public keys also will be generated. By implementing a prime number generation circuit 12a within the mobile telephone 10 that always generates the same prime numbers, the same RSA keys can be generated each time they are needed, and then erased after use. Moreover, by basing the prime number generation of the circuit 12a on a unique characteristic of the mobile telephone 10, the RSA keys will be unique for each mobile telephone 10. This eliminates the need of externally generating the RSA keys and then storing and encrypting them in the mobile telephone 10.

To generate the same prime numbers p and q, an HMAC operation may be used in conjunction with a key such as, for example, a hardware dependent key K of the mobile telephone 10, which, for a given string (data), always generates the same hash value (e.g., h=HMAC(K, data)). As is well known by those having ordinary skill in the art, a keyed-hash message authentication code, or HMAC, is a type of message authentication code (MAC) calculated using a cryptographic hash function in combination with a secret key. As with any MAC, it may be used to simultaneously verify both the data integrity and the authenticity of a message. An iterative hash function breaks up a message into blocks of a fixed size and iterates over them with a compression function. For example, MD5 and SHA-1 operate on 512-bit blocks. The size of the output of HMAC is the same as that of the underlying hash function, although it can be truncated if desired.

Preferably, the key K is randomly generated and unique for every mobile telephone 10. A key K embodied as a hardware dependent key may be generated during production, for example, and permanently stored in the mobile telephone (e.g., burned into read-only memory or ROM) in an encrypted format.

Further, the calculated hash value preferably has a length of twenty bytes, although other lengths are possible. A length of twenty bytes or more suggests that the HMAC function should be called multiple times (e.g., until the generated number has the desired length) using the same key (K) and the same string (data), wherein the string is composed in a sequential manner such that it can be repeatedly used at any time. Exemplary code is shown below.

```
const EHMAC_OUT_LEN = 20;
expectedPrimeLen = 128 bytes;
Len = 0;
K = GetHardwareKey( );
p=""
q=""
generation_string_p = "P_PRIME_STRING"
   || DevicesIMEINumber || Len;
generation_string_q = "Q_PRIME_STRING"
   || DevicesIMEINumber || Len;
while (Len < expectedPrimeLen)
{
    generation_string_p[last2bytes] = Len;
    generation_string_q[last2bytes] = Len;
    p = p || HMAC(K, generation_string_p);
    q = q || HMAC(K, generation_string_q);
    Len += EHMAC_OUT_LEN;
}
```

Once the generated values for p and q are of the desired length, they are considered to be probably prime numbers (i.e., an integer that satisfies a specific condition also satisfied by all prime numbers). To ensure the probably prime numbers are in fact prime, a check or test is performed on the probably numbers. More specifically, the generated values of p and q are converted to odd numbers (if not already odd) and then checked for primality. If the generated values for p and q are found to be prime, then they are used to generate the RSA keys. If one or both of the probably prime numbers are not found to be prime, then the number that has failed is incremented by two and then tested again. If the new number fails the test, then it is increased by two and so on until the test is satisfied. This process is repeated until the number is found to be prime. Once prime numbers are found for both p and q, they are used to generate the RSA key as described herein.

Exemplary code for checking if the number is odd or even and for testing primality is shown below.

```
If ( p[expectedPrimeLen – 1] % 2 = = 0 )    ///< Check if even number
    p[expectedPrimeLen – 1] ++ ;
If ( q[expectedPrimeLen – 1] % 2 = = 0 )    ///< Check if even number
    q[expectedPrimeLen – 1] ++ ;
i = 0;
p_test = p ;
while ( !isPrime( p_test ) )                /// < Check for primality
{
    p_test = p + (i * 2) ;                  /// < inc number for i*2
    i++;
}
p = p_test;
i = 0;
q_test = q ;
while ( !isPrime( q_test ) )                /// < Check for primality
{
    q_test = q + (i * 2) ;                  /// < inc number for i*2
    i++;
}
q = q_test;
```

Another way of searching for prime numbers is to regenerate the last X bytes of the originally generated prime number (i.e., the probably prime number) until the primality test is satisfied. Exemplary code is shown below.

```
If ( p[expectedPrimeLen – 1] % 2 = = 0 )    ///< Check if even number
    p[expectedPrimeLen – 1] ++ ;
If ( q[expectedPrimeLen – 1] % 2 = = 0 )    ///< Check if even number
    q[expectedPrimeLen – 1] ++ ;
i = Len + 1;
while ( !isPrime( p_test ) )                /// < Check for primality
{
    // Replace last X bytes in p with new value
    P[lastXbytes] = HMAC (K, generation_string_p || i ) ;
    i++;
}
p = p_test;
i = Len + 1;
while ( !isPrime( q_test ) )                /// < Check for primality
{
    // Replace last X bytes in p with new value
    Q[lastXbytes] = HMAC (K, generation_string_q || i ) ;
    i++;
}
q = q_test;
```

In the above example, the last X bytes of the probably prime number are replaced with newly generated data using an HMAC function based on the key K and the string data. This process is repeated until the probably prime number is found to be prime.

Regardless of which of the above algorithms is used, the same two prime numbers p and q are always generated and, therefore, the same RSA key calculation is performed.

In addition to generating the same prime numbers, various data may be cached so as to improve the speed of the overall calculation. For example, the first time the calculation is performed, the entire algorithm may be executed so as to generate intermediate data needed for the calculation of p and q and the RSA keys. Once the keys are used, they can be cleared from memory along with the private exponent d. The public key exponent e as well as the modulus η are publicly known and, therefore, need not be cleared from memory as they do not create a security issue. In other words, the modulus η and public key exponent e may be cached in memory for later use.

In subsequent calculations of the RSA keys, only the data associated with the private key exponent d need be calculated, as the data associated with the public key can be retrieved from memory. Further, the generation process can be optimized by caching the public key in non-volatile memory (e.g., a flash memory, hard drive, etc.) once the keys have been generated for the first time. Then, when the public key is needed, the calculation for generating the public key does not need to be executed, as it can be simply retrieved from memory and used immediately.

An advantage of the proposed key generation method is that the factory process of generating the keys, formatting them into the appropriate image, protecting the image and flashing the image to the mobile telephone can be omitted. This inherently removes the requirement of maintaining a database for all the keys and synchronizing different factory tools and databases. Further, the mobile telephone need not be booted at the factory in order to re-encrypt the RSA keys with the hardware dependent key, which ensures a higher level of security in protecting the key.

Figure 4:
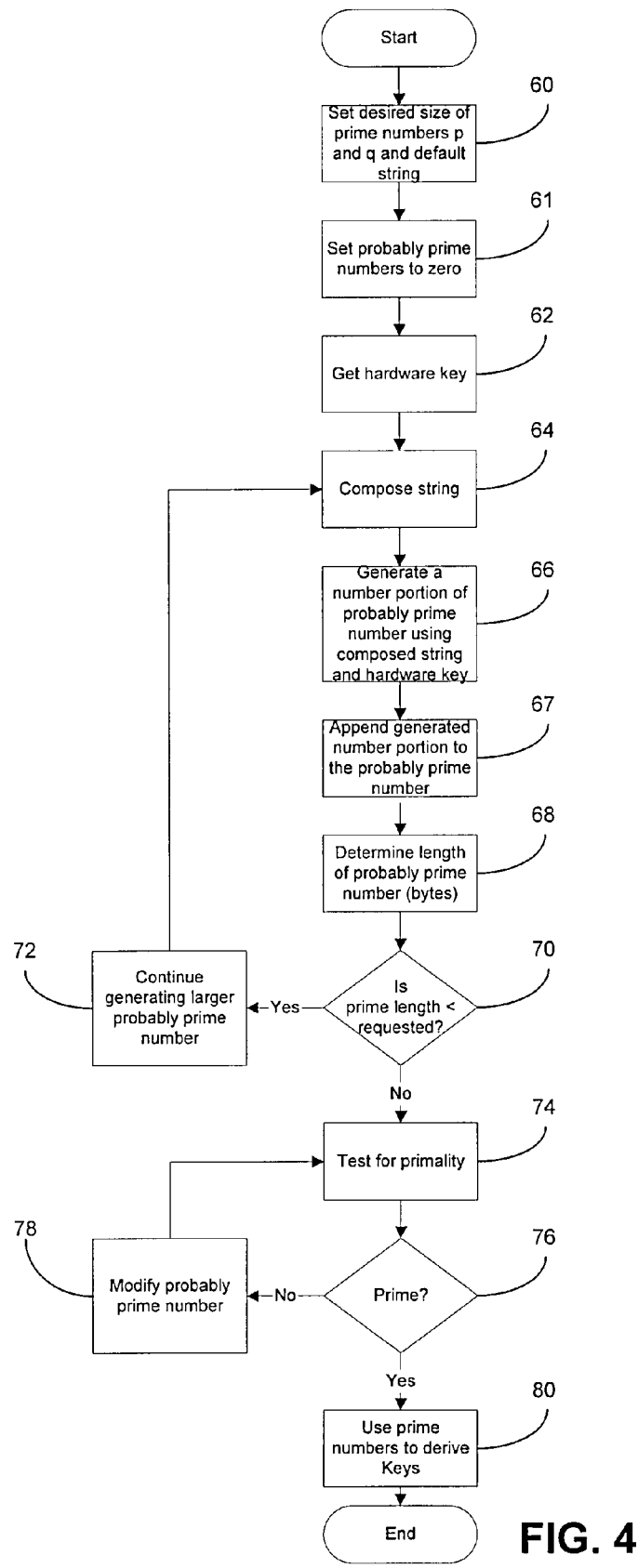
FIG. 4 is a flow chart of an exemplary prime number generation function that may be used to generate RSA keys in accordance with the present invention.

Another benefit is that the mobile telephone does not require rework if the RSA keys are lost (e.g., corrupted or erased within the mobile telephone), as the RSA keys are automatically generated each time they are needed. Further, it the key K for the specific international mobile equipment identity (IMEI) were stored in a protected database, then a mobile telephone could be cloned by flashing the IMEI and hardware dependent key, which would enable a user to use protected content (e.g., DRM content) that had been previously downloaded and stored on a memory stick, for example With additional reference to FIG. 4, illustrated are logical operations to implement an exemplary method of generating prime numbers for use in creating private and public RSA keys in the mobile telephone 10. FIG. 4 illustrates the steps that may be implemented to derive the same prime number each time an RSA key is needed. The exemplary method may be carried out by executing an embodiment of the RSA key generation function 12, for example. Thus, the flow chart of FIG. 4 may be thought of as depicting steps of a method carried out by the mobile telephone 10. Although FIG. 4 show a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow for the RSA key generation function 12 may begin at block 60 where the desired size (e.g., the number of bytes) of the prime numbers p and q is selected and a string for derivation of the prime numbers is obtained. The string may be obtained from a fixed or predetermined string in combination with a unique identifier of the device. Preferably, the selected size of the prime numbers is large, such as 128 bytes or more, as larger prime numbers enhance the level of security in the RSA keys. At block 61, probably prime numbers p and q are set to zero (e.g., variables for the probably prime numbers are initialized to zero).

Then at block 62, the key K, such as the hardware dependent key of the electronic device, is retrieved. As noted herein, the hardware dependent key K is a unique identifier stored within the electronic device, and may be specified at the time of manufacture of the electronic device.

Next, a data string for use in deriving the prime numbers p and q is composed at block 64. In the case of an electronic device embodied as a mobile telephone 10, for example, the string may be composed from the IMEI in combination with a predefined data string. Exemplary code is shown below, where "string" is the string data obtained at block 60, the number "14" corresponds to the length of the IMEI in bytes, and the number "2" corresponds to the length of the variable "primeLength".

```
primeLength = 0;
prime = "";
generation_string = string || GetIMEI( ) || primeLength;
generation_string_length = strlen(string) +14 + 2;
```

Next at block 66, a number portion for each of the probably prime numbers p and q is generated from the composed data string (generation_string) and unique identifier of the mobile telephone (e.g., the hardware key). The number portion of each probably prime number may be generated using an HMAC operation, for example. Then, at block 67, each generated number portion can be appended to the respective probably prime number p or q. Since the probably prime numbers p and q are specified to have a certain length (e.g., a certain number of bytes), the length of the probably prime numbers is checked as indicated at block 68 and 70. If the generated prime numbers do not satisfy the specified length, then at block 72 generation continues so as to find a larger probably prime number (e.g., additional data may be appended to the composed string and then new probably prime numbers can be generated from the new string). This process repeats until the probably prime number satisfies the length as specified at block 60.

Once the probably prime number is of sufficient length, then at blocks 74 and 76 the probably prime number is tested for primality. Testing for primality may include converting the probably prime numbers to odd numbers (if not already odd). If the number is not prime, then at block 78 the probably prime number is modified. As described above, modifying the originally generated probably prime number can include incrementing the number by two. Then the method moves back to blocks 74 and 76 to retest. If the number again is not found to be prime, it is incremented by four (then six, eight, ten and so on) and then retested until a prime is found. Alternatively, modification may include regenerating the last X bytes of the originally generated probably prime number until the primality test is satisfied. Once prime numbers have been found for both p and q, then at block 80 the prime numbers are used to generate the RSA keys.

Figure 5B:
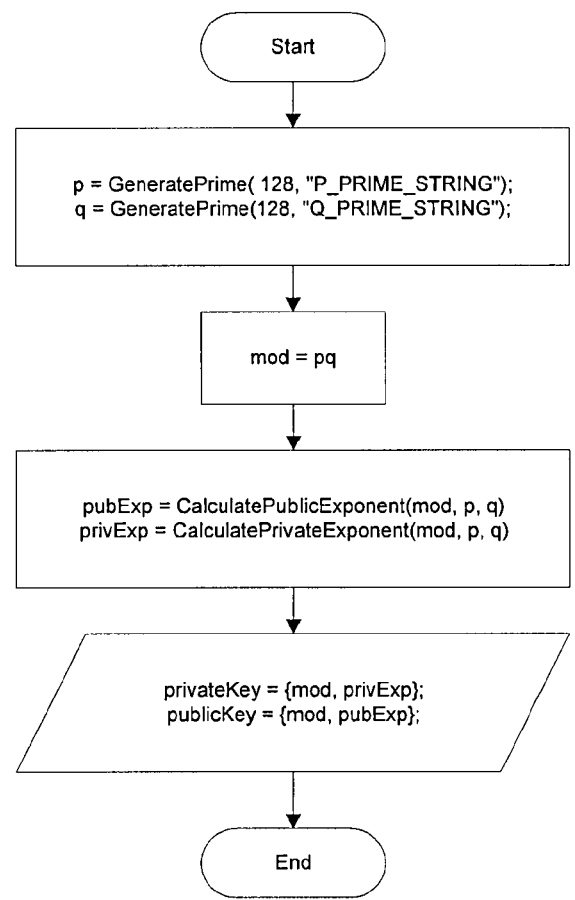
FIGS. 5A and 5B are flowcharts illustrating exemplary code that may be utilized to implement the prime number generation and key generation in accordance with the invention.
Figure 5A:
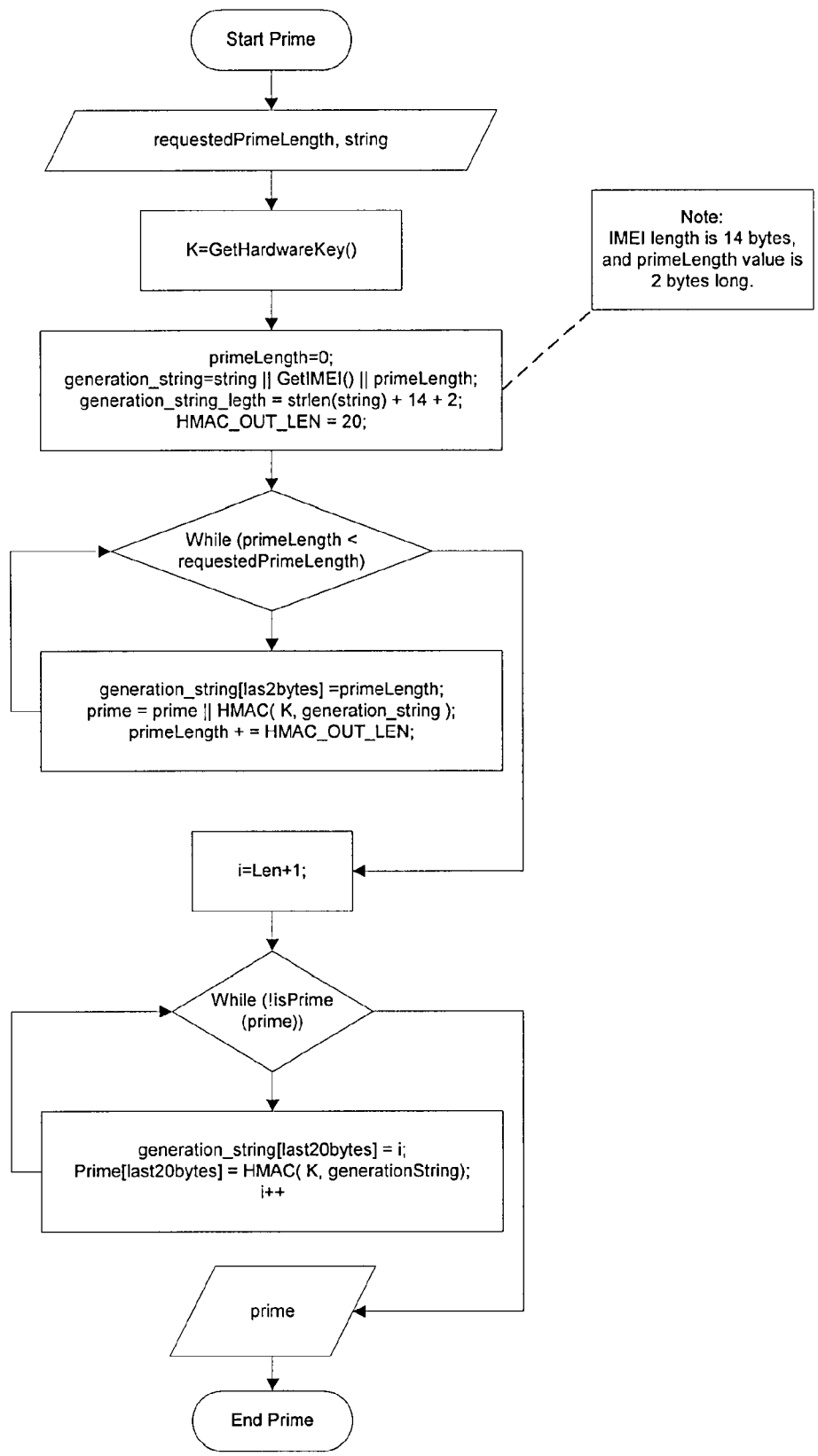

With further reference to FIGS. 5A and 5B, flowcharts illustrating exemplary code that may be used to implement the above algorithms are shown. More specifically, FIG. 5A illustrates exemplary steps for generating a prime number, while FIG. 5B illustrates exemplary steps for generating the public and private keys. Once having ordinary skill in the art of computer programming, in view of the disclosure provided herein, will readily understand the steps illustrated in FIGS. 5A and 5B and, therefore, further detail with respect to the individual steps are not provided.

Accordingly, the prime numbers utilized for generating RSA private and public keys can be generated within an electronic device such that the prime numbers (and thus the RSA keys) will always be the same for that particular device. However, since generation of the prime numbers is based on a unique key of the mobile telephone, the prime numbers (and thus the RSA keys) will be different between devices.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A portable electronic device for exchanging encrypted data with other electronic devices, comprising:
    a processor and memory; and
    a prime number generation circuit operatively coupled to said processor and memory, said prime number generation circuit including
        logic that generates, independent of user input, at least two prime numbers based on unique data characteristic of the electronic device and stored in the electronic device, wherein said at least two prime numbers are always the same at least two prime numbers.

2. The device according to claim 1, wherein the at least two prime numbers are different from one another.

3. The device according to claim 1, wherein the prime number generation circuit further includes logic that derives prime numbers that have a length of at least a predetermined number of bytes.

4. The device according to claim 1, wherein the prime number generation circuit further includes logic that uses a hardware dependent key of the electronic device as the characteristic data, said hardware dependent key being unique for each electronic device.

5. The device according to claim 4, wherein the prime number generation circuit further includes logic that uses an HMAC operation in conjunction with the hardware dependent key to generate a repeatable hash value having a predetermined length.

6. The device according to claim 1, wherein the prime number generation circuit further includes:
    logic that converts the at least two probably prime numbers to odd numbers if the at least two probably prime numbers are even numbers; and
    logic that determines if the at least two probably prime numbers are prime numbers.

7. The device according to claim 6, wherein the logic that determines if the at least two probably prime numbers are prime numbers includes:
    logic that tests the at least two probably prime numbers for primality;
    logic that increments a probably prime number of the at least two probably prime numbers by two when the respective probably prime number fails the primality test; and
    logic that repeats the determination step using the incremented probably prime number.

8. The device according to claim 6, wherein the logic that determines if the at least two probably prime numbers are prime numbers includes:
    logic that tests the at least two probably prime numbers for primality;
    logic that regenerates a predetermined number of least significant bytes of a probably prime number of the at least two probably prime numbers that fails the primality test; and
    logic that repeats the primality test and the regeneration of the least significant bytes until the probably prime number is a prime number.

9. The device according to claim 1, further comprising logic that caches parameters utilized in generating the at least two prime numbers, and logic that reuses the cached parameters during subsequent RSA key generation.

10. The device according to claim 9, wherein the logic caches at least one of an RSA public key exponent or a modulus of both the public key and a private key.

11. The device according to claim 1, further comprising an RSA generation circuit operative to generate public and private RSA keys within the electronic device based on the at least two prime numbers.

12. The device according to claim 1, wherein the portable electronic device is a mobile telephone.

13. A method for generating at an RSA key pair within a portable electronic device, comprising:
    generating, independent of user input, at least two prime numbers based on unique data characteristic of the electronic device and stored within the electronic device, wherein said at least two prime numbers are always the same at least two prime numbers; and using the at least two prime numbers to generate a private and public RSA key.

14. The method according to claim 13, further comprising clearing the private RSA key from memory after use of the private RSA key.

15. The method according to claim 13, wherein generating includes deriving prime numbers that have a length of at least a predetermined number of bytes.

16. The method according to claim 13, wherein generating includes using a hardware dependent key of the electronic device as the unique data.

17. The method according to claim 16, wherein generating includes using an HMAC operation in conjunction with the hardware dependent key to generate a repeatable hash value having a predetermined length.

18. The method according to claim 13, wherein generating includes:

generating at least two probably prime numbers;

converting respective ones of the at least two probably prime numbers to odd numbers if the respective ones of the at least two probably prime numbers are even numbers; and determining if the at least two probably prime numbers are prime numbers.

19. The method according to claim 18, wherein determining if the at least two probably prime numbers are prime numbers includes:

testing the at least two probably prime numbers for primality;

incrementing respective ones of the at least two probably prime numbers by two when the respective probably prime numbers fail the primality test; and repeating the determination step using the respective incremented probably prime number.

20. The method according to claim 18, wherein determining if the at least two odd numbers are prime includes:

testing the at least two odd numbers for primality;

regenerating a predetermined number of last bytes of the at least two probably prime numbers when the respective odd numbers are not prime; and repeating the testing and regenerating steps until the at least two odd numbers are prime.

21. The method according to claim 13, further comprising caching parameters utilized in generating the at least two prime numbers, and reusing the cached parameters during subsequent RSA key generation.

22. The method according to claim 21, wherein caching includes caching at least one of an RSA public key exponent or a modulus of both the public key and a private key.

* * * * *